US011889384B2

(12) United States Patent
Shin et al.

(10) Patent No.: US 11,889,384 B2
(45) Date of Patent: Jan. 30, 2024

(54) LOCATION VERIFICATION METHOD AND SYSTEM FOR SMART CITY, AND MOBILE COMMUNICATION DEVICE THEREFOR

(71) Applicant: INDUSTRY ACADEMY COOPERATION FOUNDATION OF SEJONG UNIVERSITY, Seoul (KR)

(72) Inventors: Ji Sun Shin, Seoul (KR); Shin Cheol Lee, Seoul (KR)

(73) Assignee: INDUSTRY ACADEMY COOPERATION FOUNDATION OF SEJONG UNIVERSITY, Seoul (KR)

(*) Notice: Subject to any disclaimer, the term of this patent is extended or adjusted under 35 U.S.C. 154(b) by 176 days.

(21) Appl. No.: 17/509,581

(22) Filed: Oct. 25, 2021

(65) Prior Publication Data

US 2023/0039247 A1 Feb. 9, 2023

(30) Foreign Application Priority Data

Aug. 5, 2021 (KR) .......................... 10-2021-0103369

(51) Int. Cl.
| | |
|---|---|
| *H04W 4/029* | (2018.01) |
| *H04W 8/08* | (2009.01) |
| *G01S 19/01* | (2010.01) |
| *H04W 12/63* | (2021.01) |
| *H04L 9/08* | (2006.01) |
| *H04L 9/32* | (2006.01) |

(52) U.S. Cl.
CPC ............. *H04W 4/029* (2018.02); *G01S 19/01* (2013.01); *H04L 9/0825* (2013.01); *H04L 9/3247* (2013.01); *H04W 8/08* (2013.01); *H04W 12/63* (2021.01); *H04L 2209/80* (2013.01)

(58) Field of Classification Search
CPC ....... H04W 12/06; H04W 12/64; H04W 4/02; H04W 4/029; H04W 12/069; H04W 12/108; H04W 12/0471; H04W 12/08; H04W 12/104; H04W 12/03; H04W 12/068; H04W 12/12; H04W 12/61
See application file for complete search history.

(56) References Cited

U.S. PATENT DOCUMENTS 10,785,647 B1 * 9/2020 Perfitt ................. H04W 12/122
10,805,402 B1 * 10/2020 Whitman ............ H04W 12/104

FOREIGN PATENT DOCUMENTS

| KR | 10-2016-0045283 A | 4/2016 |
|---|---|---|
| KR | 10-2017-0056098 A | 5/2017 |
| KR | 10-2088716 B1 | 3/2020 |

OTHER PUBLICATIONS

Office action dated Feb. 24, 2022 from Korean Patent Office in a counterpart Korean Patent Application No. 10-2015-0118195 (English translation is also submitted herewith.).

* cited by examiner

*Primary Examiner* — Kwasi Karikari
(74) *Attorney, Agent, or Firm* — The PL Law Group, PLLC

(57) ABSTRACT

A location verification system according to an embodiment of the present disclosure includes a plurality of base stations located in respective preset areas and transmitting, to an adjacent mobile communication device, location verification information obtained by signing GPS information on the base stations with a private key. It is possible to expect an effect of re-verifying a location of a mobile communication device, such as a drone or a smart car, at a destination, when the mobile communication device has moved to the destination based on GPS information.

16 Claims, 8 Drawing Sheets

LOCATION VERIFICATION METHOD AND SYSTEM FOR SMART CITY, AND MOBILE COMMUNICATION DEVICE THEREFOR

CROSS-REFERENCE TO RELATED APPLICATION(S)

This application claims the benefit under 35 USC § 119(a) of Korean Patent Application No. 10-2021-0103369, filed on Aug. 5, 2021, in the Korean Intellectual Property Office, the entire disclosure of which is incorporated herein by reference for all purposes.

BACKGROUND

1. Field

The following description relates to a location verification method and system for a smart city and a mobile communication device therefor.

2. Description of Related Art

A technology for moving to a destination based on global-positioning-system (GPS) information, such as a drone or a smart car, is being used in various fields. For this reason, the reliability of GPS signals is emerging as an important issue.

Meanwhile, a GPS spoofing attack is an interference that causes potential satellite signal loss and position loss through radio interference, leading a receiver to believe that it is in a wrong location. During the GPS spoofing attack, a fake GPS signal transmitted by a nearby wireless transmitter to a target receiver, such as a drone, may lead the target receiver to move in a direction different from its original target direction or mistake its current location.

Accordingly, an operator has recognized the need for research on technology for securing the reliability of GPS information of mobile communication devices such as drones.

Examples of the related art include Korean Patent Laid-Open Publication No. 10-2016-0045283 (Date: Apr. 27, 2016).

SUMMARY

In one general aspect, there is provided a location verification method for a smart city, including: broadcasting, at a mobile communication device, a location verification request including a random number value on the mobile communication device, a mobility identification (ID), and a location verification request message after arriving at a destination; generating, at a base station receiving the location verification request, a location verification message including at least one of the random number value on the mobile communication device and the mobility ID, a public key, GPS information of the base station, and a current time on the base station; generating a signature value by signing the location verification message with a private key; transmitting location verification information including the location verification message, the signature value, and the public key to the mobile communication device; and performing, at the mobile communication device, a procedure of verifying a location of the mobile communication device, by checking a validity of the signature value using a public key matching the public key when the matching public key is present among pre-stored public keys, and checking the GPS information of the base station.

The base stations may be located in respective preset areas when there are a plurality of the base stations, and the location verification method may further include, prior to the broadcasting of the location verification request: receiving, at each of the plurality of base stations, issued public and private keys; generating, at the mobile communication device, the mobility ID capable of identifying the mobile communication device; and receiving, at the mobile communication device, public keys from a plurality of valid base stations located at the destination to store the public keys.

In the location verification method for a smart city, in the receiving of the public keys to store the public keys, the public keys may be managed by building a Bloom filter when a memory usage restriction of the mobile communication device is a first type.

In the location verification method for a smart city, in the receiving of the public keys to store the public keys, the public keys may be managed in a form of a table when a memory usage restriction of the mobile communication device is a second type.

In the location verification method for a smart city, in the receiving of the public keys to store the public keys, an ID may be assigned to each destination when there are a plurality of destinations, and the public keys may be stored and managed by being classified based on the ID for each destination.

In the location verification method for a smart city, in the performing of the location verification procedure, a determination may be made that a location re-verification procedure is successful, when the location verification procedure is completed more than a preset number of times.

In the location verification method for a smart city, in the performing of the location verification procedure, the mobile communication device may perform an anti-disturbance verification procedure for the location verification information through any one of a location verification information reply time criterion, GPS information and current time, and a combination thereof.

In another general aspect, there is provided a location verification method for a smart city, including: broadcasting, at a base station, location verification information including at least one of a location verification message, an address ID, and a signature value; receiving, at a mobile communication device moving to a specific destination, the location verification information from the base station located at the destination; and verifying, at the mobile communication device, a current location of the mobile communication device by checking the location verification information based on the address ID corresponding to the destination and the signature value.

The location verification method for a smart city may further include, prior to the broadcasting of the location verification information: setting, at the base station, an address ID capable of identifying the base station; and receiving, at the base station, a private key issued for the address ID.

The location verification message may include GPS information of the base station, a current time on the base station, and the address ID.

In the location verification method for a smart city, in the broadcasting of the location verification information, the base station may generate the signature value by signing the GPS information of the base station and the current time on the base station with the private key.

In still another general aspect, there is a provided a location verification system for a smart city including a plurality of base stations located in respective preset areas and transmitting, to an adjacent mobile communication device, location verification information obtained by signing GPS information on the base stations with a private key.

The base station may include: a location generator for generating a location verification message including at least one of a random number value on the mobile communication device and a mobility ID, a public key, GPS information of the base station, and a current time on the base station, when a location verification request transmitted from the mobile communication device is received; and a signature processor for transmitting, to the mobile communication device, the location verification information including a signature value generated by signing the location verification message with a private key, the location verification message, and the public key.

The base station may further include a key generator for receiving the public key and the private key of the base station issued through a key generation server.

The base station may include a location generator for generating a location verification message including GPS information of the base station, a current time on the base station, and the address ID, and a signature processor for generating a signature value by signing the GPS information of the base station and the current time on the base station with the private key issued for the address ID, and broadcasting the location verification information including at least one of the location verification message, the address ID, and the signature value.

The base station may broadcast the location verification information at a preset period.

In still another general aspect, there is provided a mobile communication device including: an ID generator for generating a mobility ID capable of identifying the mobile communication device; a key manager for receiving and managing public keys of a plurality of valid base stations located at a destination in advance; and a location verificator for broadcasting a location verification request including a random number value, the mobility ID, and a location verification request message after the mobile communication device arrives at the destination, and re-verifying a current location of the mobile communication device based on location verification information transmitted from a plurality of base stations.

The key manager may manage the public keys by building a Bloom filter when a memory usage restriction of the mobile communication device is a first type, and may manage the public keys in a form of a table when a memory usage restriction of the mobile communication device is a second type.

The key manager may assign an ID to each destination when there are a plurality of destinations, and may store and manage the public keys by classifying the public keys based on the ID for each destination.

The location verificator may determine that a location re-verification procedure is successful when the location verification procedure based on the location verification information is completed more than a preset number of times.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

A smart city, disclosed below, is an urban area that provides information needed to efficiently manage assets and resources using various types of electronic data collection sensors, which may refer to an area in which communication network infrastructure, such as an access point (AP), is present in each zone. In this case, the access point may have the same configuration as a base station described below.

Figure 1:
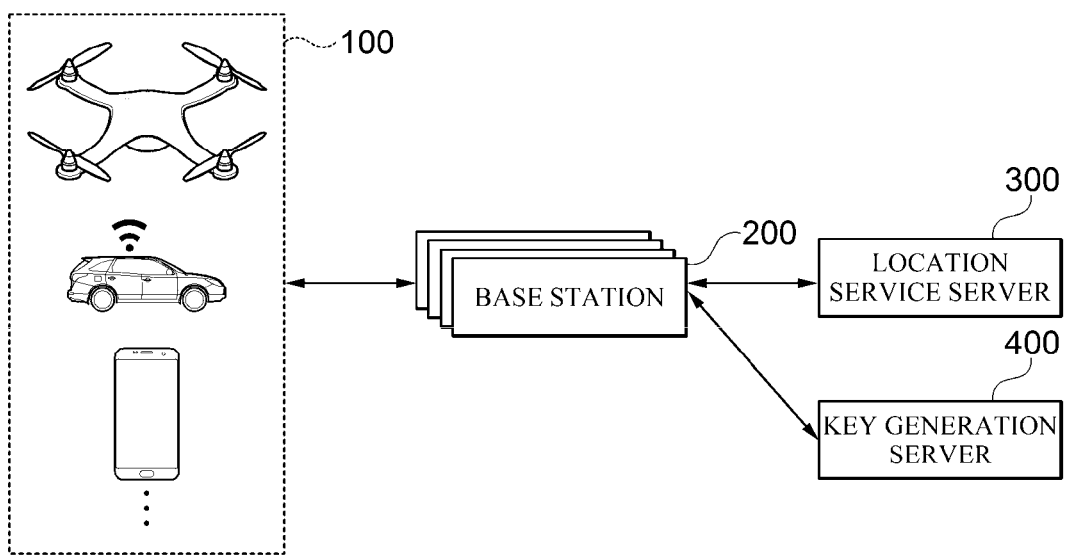
FIG. 1 is a block diagram for describing a location verification system for a smart city according to one embodiment of the present disclosure.
Figure 2:
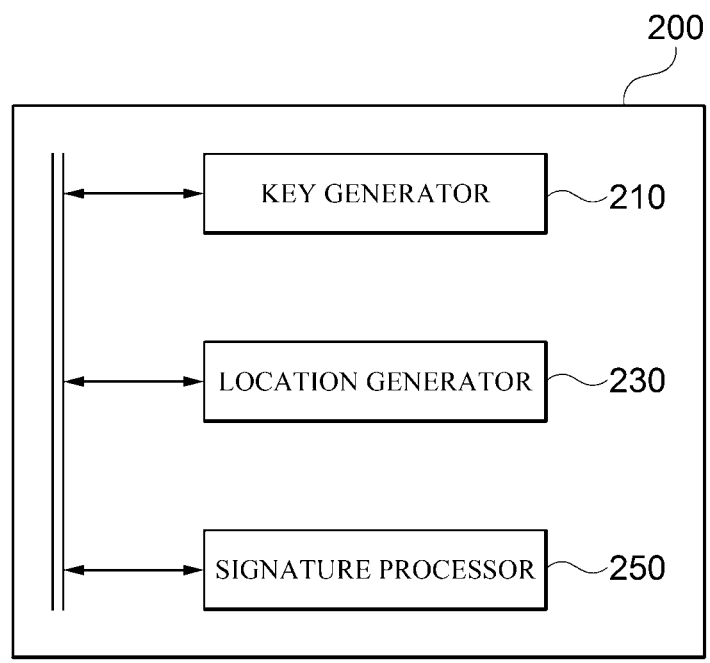
FIG. 2 is a block diagram for describing a base station of FIG. 1.

FIG. 1 is a block diagram for describing a location verification system for a smart city according to one embodiment of the present disclosure, and FIG. 2 is a block diagram for describing a base station.

Hereinafter, the present disclosure will be described with reference to FIG. 4, which is a diagram for describing an example of a location verification method according to one embodiment of the present disclosure, and FIG. 5, which is a diagram for describing another example of a location verification method according to one embodiment of the present disclosure.

Referring to FIG. 1, the location verification system includes a plurality of base stations 200 located in respective preset areas and transmitting, to an adjacent mobile communication device 100, location verification information obtained by signing GPS information on the base stations with a private key.

The above-described location verification system may further include the mobile communication device 100 that requests verification of its current location as it has moved to a destination, a location service server 300 that manages GPS information and the like of the plurality of base stations 200, and a key generation server 400 for generating private keys and public keys of the base stations 200.

Referring to FIG. 2, the base station 200 may include a key generator 210, a location generator 230, and a signature processor 250.

In this case, each component of the base station 200 may be classified into two cases according to a method of providing location verification information and may be described accordingly.

As an example, a case will be described in which the base stations 200 perform a location verification procedure through two-way communication for transmitting and receiving information to and from the mobile communication device 100, by way of example.

The key generator 210 may receive its public key ($pk_N$) and private key ($sk_N$) issued through the key generation server 400.

The location generator 210 may generate a location verification message including at least one of a random number value on the mobile communication device and a mobility ID M_ID, a public key, GPS information of the base station, and a current time on the base station, when a location verification request transmitted from the mobile communication device 100 is received. In this case, the current time on the base station may be used as verification information to prevent disturbances such as GPS spoofing.

The signature processor 250 may transmit, to the mobile communication device 100, location verification information including a signature value σ generated by signing the location verification message with a private key, the location verification message, and the public key. In this case, the signature processor 250 may transmit the location verification information to the mobile communication device 100 through a network communication interface 26 of FIG. 8. In this case, the signature processor 250 may perform a digital signature based on an elliptic curve digital signature algorithm (ESDSA).

Figure 4:
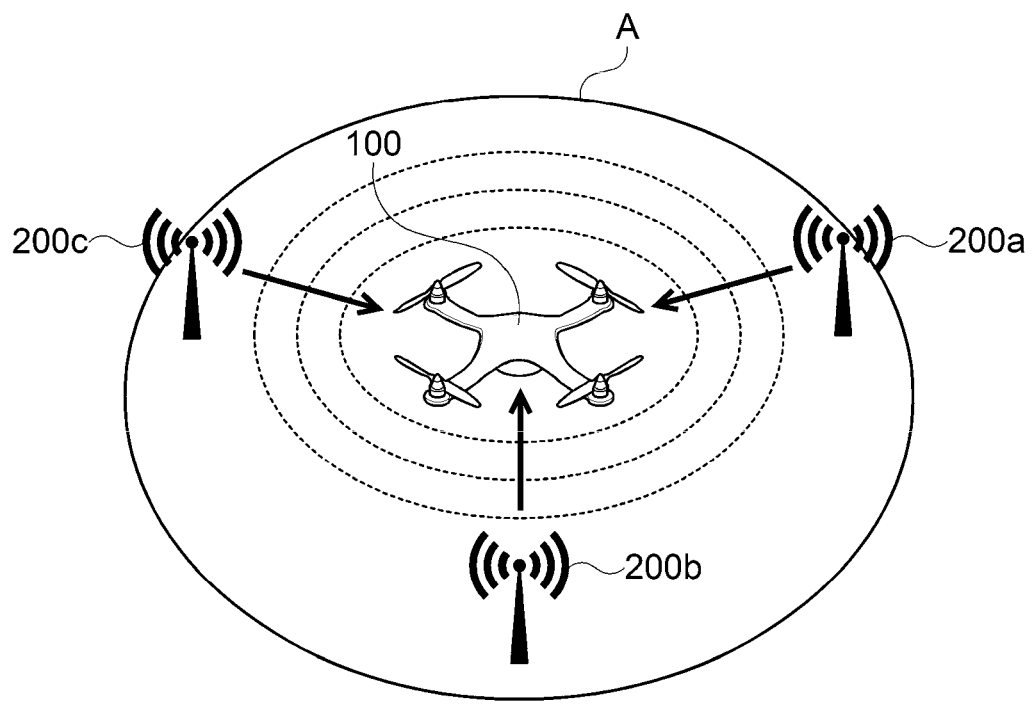
FIG. 4 is a diagram for describing an example of a location verification method according to one embodiment of the present disclosure.

Referring to FIG. 4, a plurality of base stations 200a, 200b, and 200c located in an area A may receive the location verification request broadcasted from the mobile communication device 100 as the mobile communication device 100 enters the area A. Then, the plurality of base stations 200a, 200b, and 200c transmit the above-described location verification information to the mobile communication device 100 so that the mobile communication device 100 may re-verify its GPS information.

As another example, a case will be described in which the base stations 200 perform the location verification procedure in a way of transmitting location verification information at a preset period, by way of example.

The key generator 210 may set an address ID for identifying the key generator 210.

In addition, the key generator 210 may be issued with a private key for the address ID.

For example, in a smart city, the base station 200 may set its address (e.g., street information) "XX Neungdong-ro, Gwangjin-gu, Seoul", or "XX Neungdong-ro, Gwangjin-gu", or "XX Neungdong-ro" as its ID, and may be issued with the private key for the corresponding ID from the key generation server 400 for ID-based signature.

In this case, since the management of the private key of the key generation server 400 is important in the ID-based signature method, the key generation server 400 may be provided for each gu (distinct), or for each area unit smaller than gu, or the private key and the public key may be periodically updated in the key generation server 400. In order for the mobile communication device 100 such as a drone or a smart car to receive a location-based service, the integrity of the public key is important, and for this purpose, an app or service software that provides a location service may be periodically updated to maintain the latest parameter values.

The location generator 230 may generate a location verification message including GPS information of the base station, a current time on the base station, and the address ID.

The signature processor 250 may generate a signature value by signing the GPS information of the base station and the current time on the base station with the private key issued for the address ID, and broadcast the location verification information including at least one of the location verification message, the address ID, and the signature value.

Figure 8:
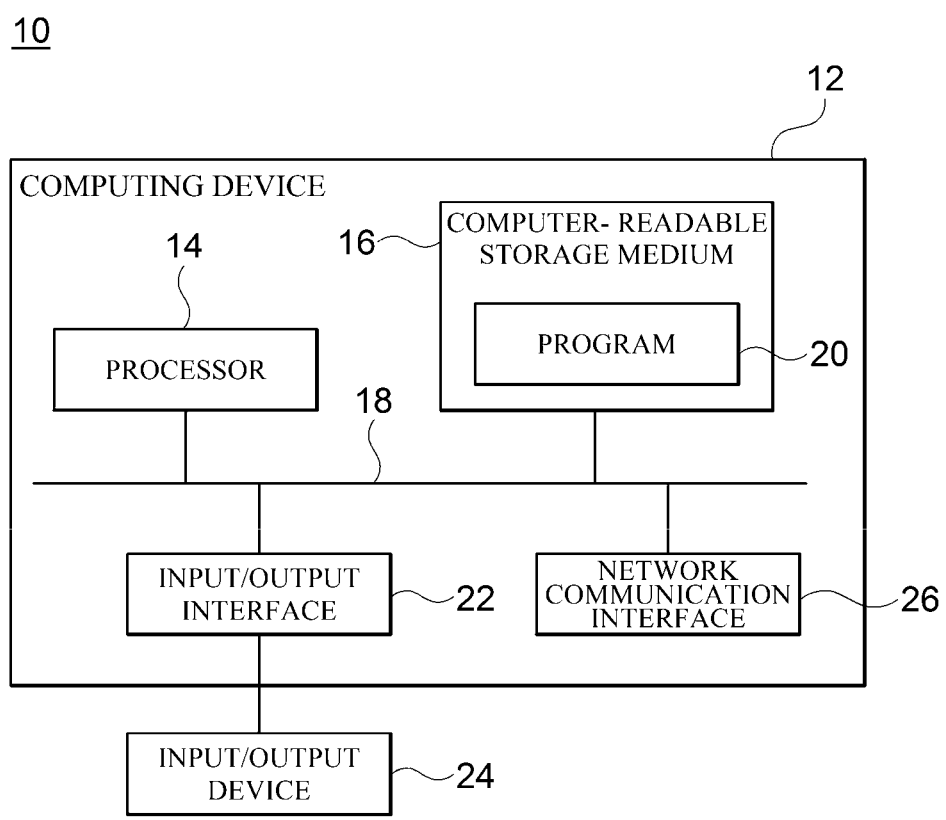
FIG. 8 is a block diagram for illustrating a computing environment including a computing device according to an embodiment of the present disclosure.

In this case, the base station 200 may broadcast the location verification information through the network communication interface 26 of FIG. 8 at a preset period.

Figure 5:
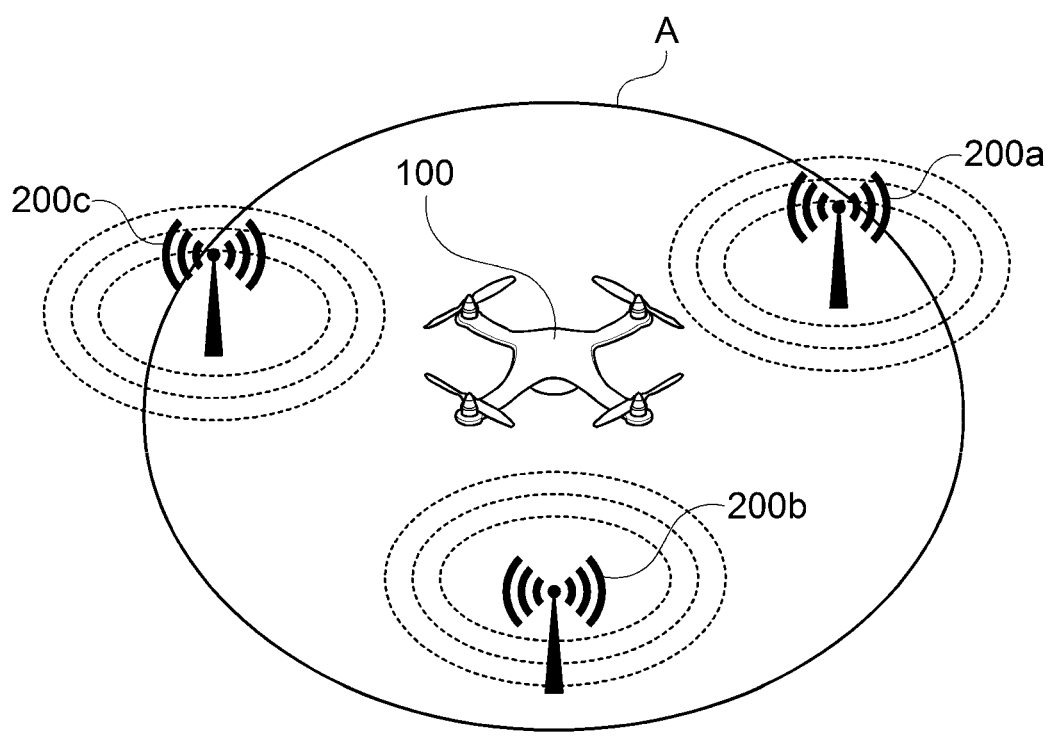
FIG. 5 is a diagram for describing another example of a location verification method according to one embodiment of the present disclosure.

Referring to FIG. 5, the plurality of base stations 200a, 200b, and 200c located in the area A may broadcast location verification information at a preset period, and the mobile communication device 100 entering the area A may re-check its GPS information based on the location verification information received from the plurality of base stations 200a, 200b, and 200c.

In this case, the mobile communication device 100 may omit a procedure of obtaining and storing the public keys of the base stations 200a, 200b, and 200c located at a destination (e.g., area A) before moving to the destination. Accordingly, an effect that the efficiency may be relatively high in terms of the mobile communication device 100 may be expected.

Figure 3:
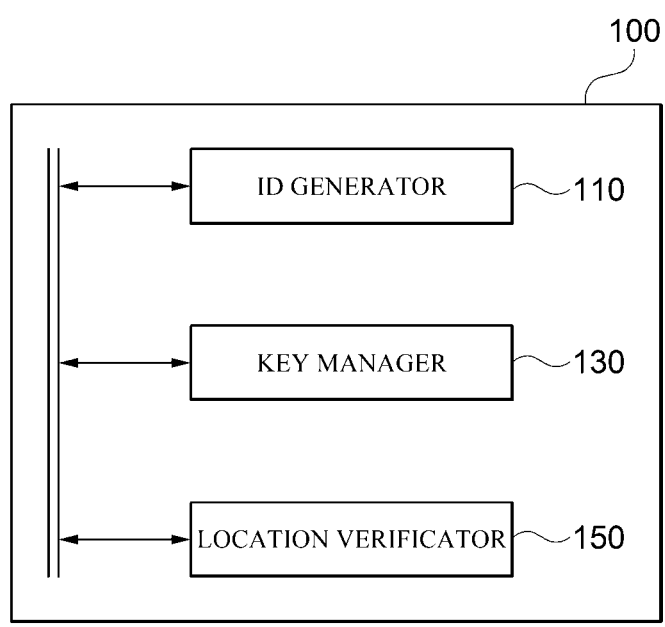
FIG. 3 is a block diagram for describing a mobile communication device of FIG. 1.

FIG. 3 is a block diagram for describing the mobile communication device of FIG. 1.

Referring to FIG. 3, the mobile communication device 100 includes an ID generator 110, a key manager 130, and a location verificator 150.

The ID generator 110 may have a configuration for generating a mobility ID capable of identifying the ID generator 110. In this case, the mobility ID may include a mobility name and mobility information, but is not limited thereto.

The key manager 130 may have a configuration for receiving and managing public keys of a plurality of valid base stations 200 located at a destination in advance.

The key manager 130 may manage the public keys by building a Bloom filter when a memory usage restriction of the mobile communication device 100 is a first type. In this case, the memory usage restriction of the first type means a type in which the memory usage is restricted to less than or equal to a reference value, and may be applied to a device in which the memory usage is relatively restricted, such as a drone.

The key manager 130 may manage the public keys in a form of a table when the memory usage restriction of the mobile communication device 100 is a second type. The memory usage restriction of the second type means a type in which the memory usage is not restricted as compared with the first type, and may be applied to an object where the memory usage is not relatively restricted, such as a smart car.

The above-described first type may have a smaller memory usage standard than the second type.

The key manager 130 may assign an ID to each destination when there are a plurality of the destinations, and may store and manage the public keys by classifying public keys based on the ID for each destination.

For example, when the first type is applied to the mobile communication device 100 such as a drone, and public keys may be stored and managed by being classified into forms of BF destination ID1, BF destination ID2, BF destination ID3, and the like. When the second type is applied to the mobile communication device 100 such as a smart car, and public keys may be stored and managed by being classified into forms of T destination ID1, T destination ID2, T destination ID3, and the like.

The mobile communication device 100 is capable of traveling with the above-described public keys of the destinations before moving to the destination. In this case, the mobile communication device 100 may store only the Bloom filter of the public keys and move to the destination, when the memory usage restriction of the mobile communication device 100 is the first type.

The storing of the public keys of the base stations 200 of the destination before moving to the destination may be applied when the base station 200 provides location verification information through two-way communication with the mobile communication device 100.

If the above-described method of FIG. 5 is applied in which the plurality of base stations 200 broadcast location verification information every preset period, the key manager 130 may omit the procedure of obtaining and storing the public keys before movement to the destination.

The location verificator 150 may have a configuration for broadcasting a location verification request including a random number value, the mobility ID, and a location verification request message after the mobile communication device arrives at the destination, and re-verifying a current location of the mobile communication device based on location verification information transmitted from a plurality of base stations 200.

The location verificator 150 may determine that a location re-verification procedure is successful when the location verification procedure based on the location verification information is completed more than a preset number of times.

If the above-described method of FIG. 5 is applied in which the plurality of base stations 200 broadcast location verification information every preset period, the location verificator 150 may perform the location re-verification procedure based on valid address IDs.

Meanwhile, the above-described mobile communication device 100 may be communicatively connected to the plurality of base stations 200 through a communication network (not shown). In some embodiments, the communication network may include the Internet, one or more local area networks, wide area networks, cellular networks, mobile networks, other types of networks, or a combination of the above networks.

In the present embodiments, the mobile communication device 100 may include a moving means movable by remote control technology or autonomous driving technology. In addition, the mobile communication device 100 may include a mobile communication terminal including a mobile communication function including short-range wireless communication.

For example, the mobile communication device 100 may include an unmanned aerial vehicle such as a drone, an autonomous driving vehicle or an autonomous driving robot such as a smart car, a mobile communication terminal such as a personal digital assistant (PDA), a cellular phone, or the like, but is not limited thereto.

Figure 6:
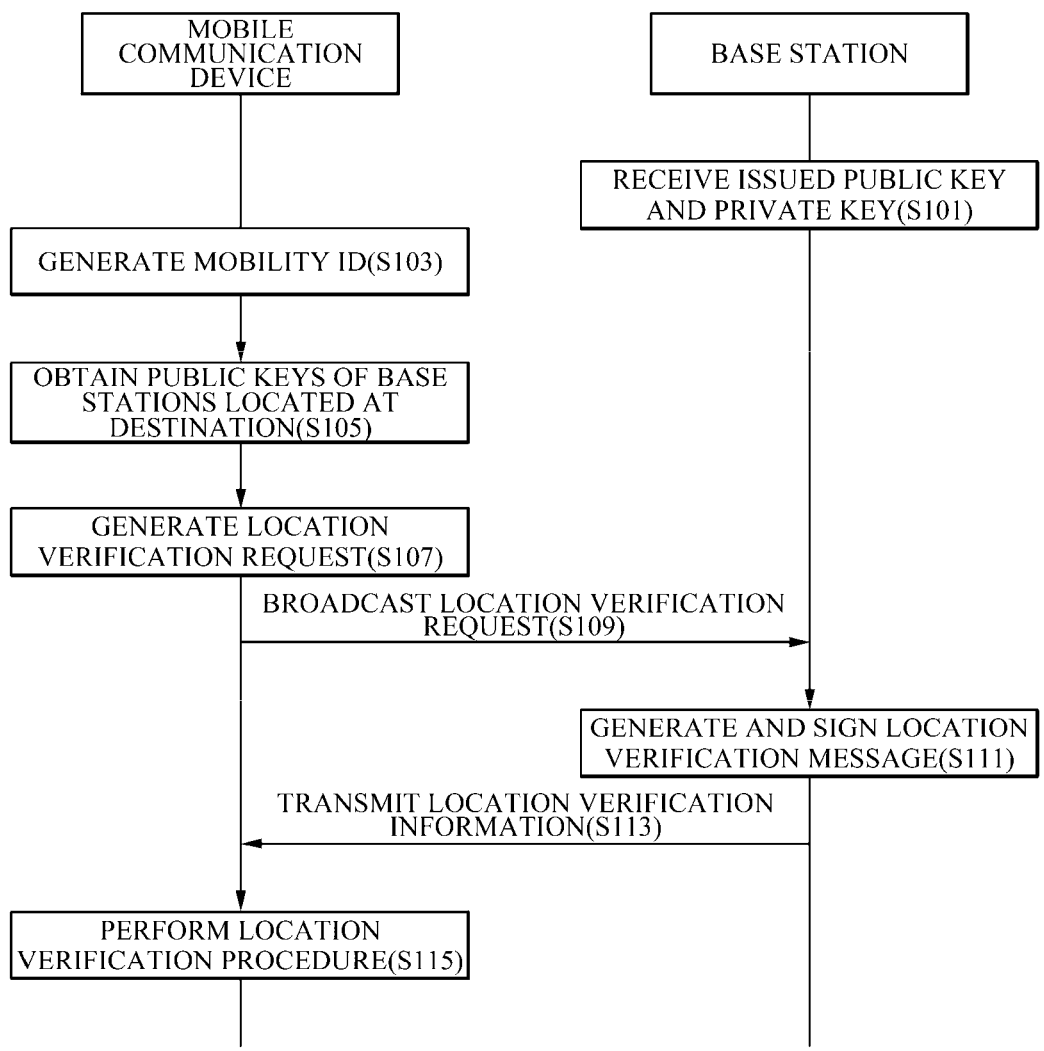
FIG. 6 is a flowchart for describing an example of a location verification method for a smart city according to one embodiment of the present disclosure.

FIG. 6 is a flowchart for describing an example of a location verification method for a smart city according to one embodiment of the present disclosure. The method illustrated in FIG. 6 may be performed, for example, by the above-described mobile communication device 100 and base stations 200. In the illustrated flowchart, the method is divided into a plurality of steps; however, at least some of the steps may be performed in a different order, performed together in combination with other steps, omitted, performed in subdivided steps, or performed by adding one or more steps not illustrated.

In step 101, each of a plurality of base stations 200 may be issued with a public key and a private key. When there are a plurality of base stations 200, the base stations may be located in respective preset areas.

In step 103, the mobile communication device 100 may generate a mobility ID capable of identifying the mobile communication device 100.

In step 105, the mobile communication device 100 may receive public keys from a plurality of valid base stations 200 located at a destination and store the received public keys.

The mobile communication device 100 may manage the public keys by building a Bloom filter when a memory usage restriction of the mobile communication device 100 is a first type.

The mobile communication device 100 may manage the public keys in a form of a table when the memory usage restriction of the mobile communication device 100 is a second type.

The mobile communication device 100 may assign an ID to each destination when there are a plurality of destinations, and may store and manage the public keys by classifying the public keys based on the ID for each destination.

In steps 107 and 109, the mobile communication device 100 may generate and broadcast a location verification request including a random number value on a mobile communication device, a mobility identification (ID), and a location verification request message after arriving at a destination.

In step 111, a base station 200 receiving the location verification request may generate a location verification message including at least one of the random number value on the mobile communication device and the mobility ID, a public key, GPS information of the base station, and a current time on the base station. In addition, the base station 200 may generate a signature value by signing the location verification message with a private key.

In step 113, the base station 200 may transmit location verification information including the location verification message, the signature value, and the public key to the mobile communication device 100.

In step 115, the mobile communication device 100 may perform a procedure of verifying a location of the mobile communication device, by checking a validity of the signature value using a public key matching the public key when the matching public key is present among pre-stored public keys, and checking the GPS information of the base station.

The mobile communication device 100 may determine that a location re-verification procedure is successful when the location verification procedure is completed more than a preset number of times.

In addition, the mobile communication device 100 may perform an anti-disturbance verification procedure for the location verification information through any one of a location verification information reply time criterion, GPS information and current time, and a combination thereof.

Specifically, an attack may occur that relays messages between the base station 200 and the mobile communication device 100 so that the mobile communication device 100 communicates with the base station 200 located farther than the actual location, causing the mobile communication device 100 to erroneously know its location. In order to prevent the attack, in the present embodiment, the mobile communication device 100 checks the reliability of location verification information by applying a timeout criterion and comparing the time between a time point when the mobile communication device 100 has transmitted the location verification request and a time point when the mobile communication device 100 has received the location verification information from the base station 200 with the location verification information reply time criterion.

In addition, in the present embodiment, the base station 200 returns information on the current time on the base station together with the GPS information, and the mobile communication device 100 checks the reliability of the location verification information based on the above-described GPS information and the current time on the base station. For example, the mobile communication device 100 may check the reliability of the location verification information by comparing the current time synchronized with the current time on the base station with the current time on the base station.

Additionally, the mobile communication device 100 may enhance security by receiving the location verification information from the base station 200 and performing the location verification procedure more than a minimum reference number of times.

Figure 7:
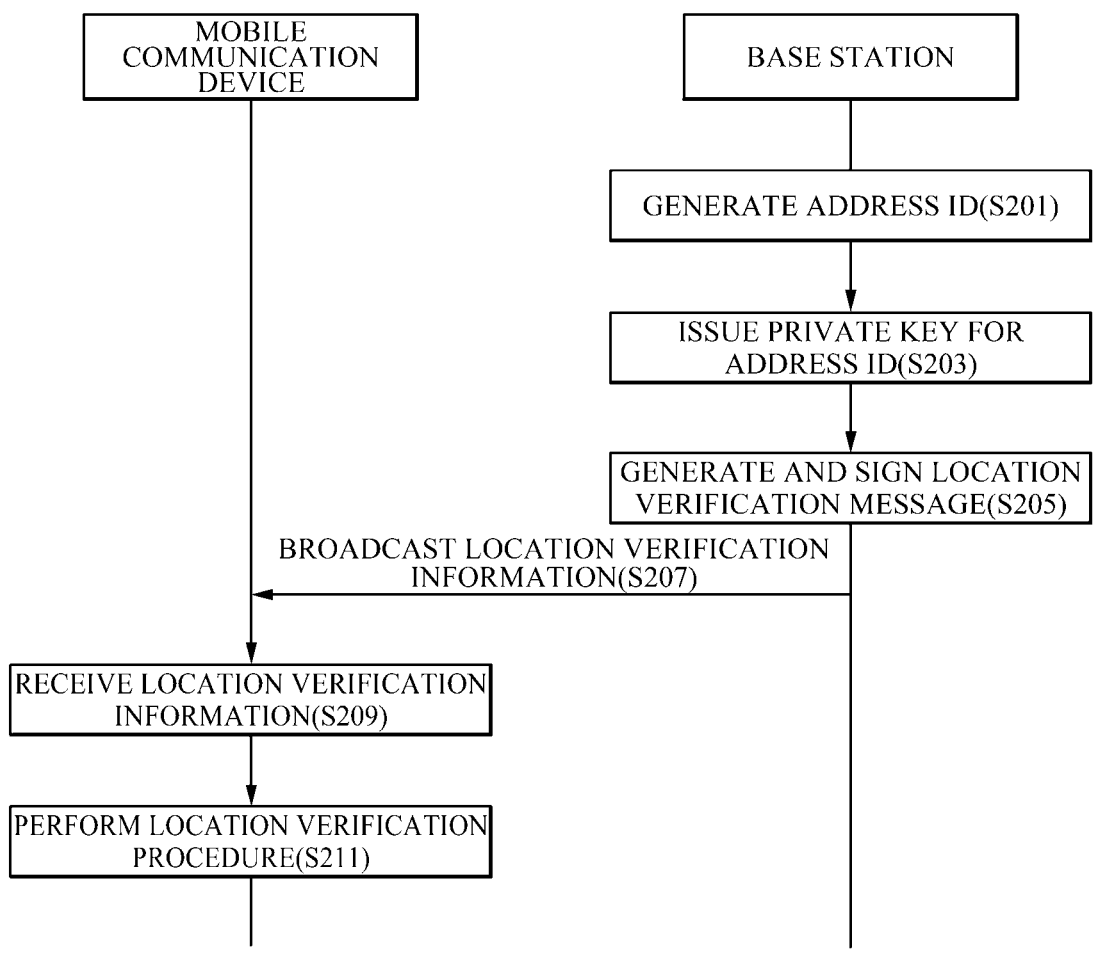
FIG. 7 is a flowchart for describing another example of a location verification method for a smart city according to one embodiment of the present disclosure.

FIG. 7 is a flowchart for describing another example of a location verification method for a smart city according to one embodiment of the present disclosure. The method illustrated in FIG. 7 may be performed, for example, by the above-described mobile communication device 100 and base stations 200. In the illustrated flowchart, the method is divided into a plurality of steps; however, at least some of the steps may be performed in a different order, performed together in combination with other steps, omitted, performed in subdivided steps, or performed by adding one or more steps not illustrated.

In step 201, the base station 200 may set an address ID capable of identifying the base station 200.

In step 203, the base station 200 may be issued with a private key for the address ID.

For example, in a smart city, the base station 200 may set its address (e.g., street information) "XX Neungdong-ro, Gwangjin-gu, Seoul", or "XX Neungdong-ro, Gwangjin-gu", or "XX Neungdong-ro" as its ID, and may be issued with the private key for the corresponding ID from the key generation server 400 for ID-based signature.

In this case, since the management of the private key of the key generation server 400 is important in the ID-based signature method, the key generation server 400 may be provided for each gu (distinct), or for each area unit smaller than gu, or the private key and the public key may be periodically updated in the key generation server 400. In order for the mobile communication device 100 such as a drone or a smart car to receive a location-based service, the integrity of the public key is important, and for this purpose, an app or service software that provides a location service may be periodically updated to maintain the latest parameter values.

In steps 205 and 207, the base station 200 may broadcast location verification information including at least one of a location verification message, an address ID, and a signature value. The location verification message may include GPS information of the base station, a current time on the base station, and the address ID.

Referring to FIG. 5, a plurality of base stations 200*a*, 200*b*, and 200*c* located in the area A broadcast the location verification information at a preset period.

In step 205, the base station 200 may generate the signature value by signing the GPS information of the base station and the current time on the base station with the private key issued for the address ID. In the present embodiment, the address ID-based signature method is applied instead of the digital signature method.

In step 209, the mobile communication device 100 moving to a specific destination may receive the location verification information from the base station 200 located at the destination.

In step 211, the mobile communication device 100 may verify a current location of the mobile communication device by checking the location verification information based on the address ID corresponding to the destination and the signature value.

Referring to FIG. 5, the mobile communication device 100 that has entered the area A may re-check GPS information of the mobile communication device 100 based on the location verification information received from the plurality of base stations 200*a*, 200*b*, and 200*c*.

When the base stations 200 of the smart city periodically broadcast their GPS information by using their address IDs as public keys in the above-mentioned ID-based manner, all mobile communication devices 100 having a valid public key may re-verify their locations through the GPS information broadcast from the corresponding locations.

In the present embodiment, the base station 200 may transmit the current time together with the GPS information when broadcasting the location verification information, thereby making it possible to prevent a GPS spoofing attack. To this end, it is natural that the current time has to be exactly matched or synchronized between the base station 200 and the mobile communication device 100. The one-way communication method for verifying a location disclosed in FIG. 7 may be relatively efficient because the mobile communication device 100 does not need to store the public key of the destination base station in advance for moving.

FIG. 8 is a block diagram exemplarily illustrating a computing environment 10 that includes a computing device suitable for use in embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the base station 200. Further, the computing device 12 may be the mobile communication device 100 or the location service server 300.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which, when executed by the processor 14, cause the computing device 12 to perform operations according to the exemplary embodiments.

The computer-readable storage medium 16 stores store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touchpad, a touch screen, or the like), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

According to embodiments of the present disclosure, it is possible to expect an effect of re-verifying a location of a mobile communication device, such as a drone or a smart car, at a destination, when the mobile communication device has moved to the destination based on GPS information.

In addition, according to embodiments of the present disclosure, the mobile communication device performs anti-GPS spoofing disturbance verification on the location verification information received from the base station located at the destination for re-verifying the location, and thus reliability of the location verification information may be improved.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A location verification method for a smart city, comprising:
    broadcasting, at a mobile communication device, a location verification request including a random number value on the mobile communication device, a mobility identification (ID), and a location verification request message after arriving at a destination;
    generating, at a base station receiving the location verification request, a location verification message including at least one of the random number value on the mobile communication device and the mobility ID, a public key, GPS information of the base station, and a current time on the base station;
    generating a signature value by signing the location verification message with a private key;
    transmitting location verification information including the location verification message, the signature value, and the public key to the mobile communication device; and
    performing, at the mobile communication device, a procedure of verifying a location of the mobile communication device, by checking a validity of the signature value using a public key matching the public key when the matching public key is present among pre-stored public keys, and checking the GPS information of the base station.

2. The location verification method of claim 1, wherein the base stations are located in respective preset areas when there are a plurality of the base stations; and
    the location verification method further comprises, prior to the broadcasting of the location verification request:
    receiving, at each of the plurality of base stations, an issued public and private keys;
    generating, at the mobile communication device, the mobility ID capable of identifying the mobile communication device; and
    receiving, at the mobile communication device, public keys from a plurality of valid base stations located at the destination to store the public keys.

3. The location verification method of claim 2, wherein in the receiving of the public keys to store the public keys, the public keys are managed by building a Bloom filter when a memory usage restriction of the mobile communication device is a first type.

4. The location verification method of claim 2, wherein in the receiving of the public keys to store the public keys, the public keys are managed in a form of a table when a memory usage restriction of the mobile communication device is a second type.

5. The location verification method of claim 2, wherein in the receiving of the public keys to store the public keys, an ID is assigned to each destination when there are a plurality of destinations, and the public keys are stored and managed by being classified based on the ID for each destination.

6. The location verification method of claim 1, wherein in the performing of the location verification procedure, a determination is made that a location re-verification procedure is successful, when the location verification procedure is completed more than a preset number of times.

7. The location verification method of claim 1, wherein in the performing of the location verification procedure, the mobile communication device performs an anti-disturbance verification procedure for the location verification information through any one of a location verification information reply time criterion, GPS information and current time, and a combination thereof.

8. A location verification method for a smart city, comprising:
setting, at a base station, an address ID capable of identifying the base station; and
receiving, at the base station, a private key issued for the address ID,
after the setting and the receiving, broadcasting, at the base station, location verification information including at least one of a location verification message, an address ID, and a signature value;
receiving, at a mobile communication device moving to a specific destination, the location verification information from the base station located at the destination; and
verifying, at the mobile communication device, a current location of the mobile communication device by checking the location verification information based on the address ID corresponding to the destination and the signature value,
wherein the location verification message includes GPS information of the base station, a current time on the base station, and the address ID,
wherein, in the broadcasting of the location verification information, the base station generates the signature value by signing the GPS information of the base station and the current time on the base station with the private key.

9. A location verification system for a smart city comprising a plurality of base stations located in respective preset areas and transmitting, to an adjacent mobile communication device, location verification information obtained by signing GPS information on the base stations with a private key,
wherein the base station includes:
a location generator for generating a location verification message including at least one of a random number value on the mobile communication device and a mobility ID, a public key, GPS information of the base station, and a current time on the base station, when a location verification request transmitted from the mobile communication device is received; and
a signature processor for transmitting, to the mobile communication device, the location verification information including a signature value generated by signing the location verification message with a private key, the location verification message, and the public key.

10. The location verification system of claim 9, wherein the base station further includes a key generator for receiving the public key and the private key of the base station issued through a key generation server.

11. A location verification system for a smart city comprising a plurality of base stations located in respective preset areas and transmitting, to an adjacent mobile communication device, location verification information obtained by signing GPS information on the base stations with a private key,
wherein the base station further includes a location generator for generating a location verification message including GPS information of the base station, a current time on the base station, and the address ID; and
a signature processor for generating a signature value by signing the GPS information of the base station and the current time on the base station with the private key issued for the address ID, and broadcasting the location verification information including at least one of the location verification message, the address ID, and the signature value.

12. The location verification system of claim 11, wherein the base station broadcasts the location verification information at a preset period.

13. A mobile communication device comprising:
an ID generator for generating a mobility ID capable of identifying the mobile communication device;
a key manager for receiving and managing public keys of a plurality of valid base stations located at a destination in advance; and
a location verificator for broadcasting a location verification request including a random number value, the mobility ID, and a location verification request message after the mobile communication device arrives at the destination, and re-verifying a current location of the mobile communication device based on location verification information transmitted from a plurality of base stations.

14. The mobile communication device of claim 13, wherein the key manager manages the public keys by building a Bloom filter when a memory usage restriction of the mobile communication device is a first type, and
manages the public keys in a form of a table when a memory usage restriction of the mobile communication device is a second type.

15. The mobile communication device of claim 13, wherein the key manager
assigns an ID to each destination when there are a plurality of destinations, and stores and manages the public keys by classifying the public keys based on the ID for each destination.

16. The mobile communication device of claim 13, wherein the location verificator determines that a location re-verification procedure is successful when the location verification procedure based on the location verification information is completed more than a preset number of times.

* * * * *